United States Patent [19]
Hoag et al.

[11] 3,851,273
[45] Nov. 26, 1974

[54] AERODYNAMIC LASER WINDOW

[75] Inventors: Ethan D. Hoag, Boston; Richard M. Patrick, Winchester; Edward V. Locke, Rockport; Richard A. Hella, Brookline, all of Mass.

[73] Assignee: Avco Corporation, Cincinnati, Ohio

[22] Filed: May 2, 1972

[21] Appl. No.: 249,607

[52] U.S. Cl. ......... 331/94.5 D, 331/94.5 C, 330/4.3
[51] Int. Cl. ............................................. H01s 3/02
[58] Field of Search ................. 331/94.5 C, 94.5 D; 330/4.3

[56] References Cited
UNITED STATES PATENTS

| | | | |
|---|---|---|---|
| 2,851,652 | 9/1958 | Dicke | 330/4.3 |
| 3,174,026 | 3/1965 | Bowers et al. | 313/174 |
| 3,509,486 | 4/1970 | Patel | 331/94.5 |
| 3,596,202 | 7/1971 | Patel | 331/94.5 |
| 3,654,569 | 12/1968 | Hausmann | 331/94.5 C |
| 3,655,336 | 5/1972 | McLafferty | 331/94.5 D |

FOREIGN PATENTS OR APPLICATIONS

777,426 6/1957 Great Britain

OTHER PUBLICATIONS

Eckbrett, "Cross Beam Electric Discharge Convection Laser," 8/15/71, pp. 101–103, A.P.L., Vol. 19, No. 4.

Gerry, "Gasdynamic Lasers," 11/70, pp. 51–58, IEEE Spectrum.

*Primary Examiner*—Maynard R. Wilbur
*Assistant Examiner*—N. Moskowitz
*Attorney, Agent, or Firm*—Charles M. Hogan, Esq.; Melvin E. Frederick, Esq.

[57] ABSTRACT

This invention relates to gas lasers wherein a gaseous laser medium is excited to provide stimulated emission of radiation in the form of a laser beam of such intensity or power that the use of transparent or semitransparent windows permitting passage of the laser beam through the wall or walls of the laser cavity is rendered difficult if not impossible. This difficulty results from the inability to prevent thermal fracture or other damage to the window or undesirable effects resulting from the passage of the high power beam through the window. This difficulty is overcome by directing the beam through an isolation assembly open to direct passage of the beam therethrough in which by means of appropriate gas flow in the isolation assembly, a flow regime is provided appropriate to the laser operating conditions and which effectively isolates the laser working region from the atmosphere or the environment surrounding the laser.

19 Claims, 7 Drawing Figures

AERODYNAMIC LASER WINDOW

There has been much development in the gas laser art principally in recent years leading to higher power and more efficient laser configurations. Such gases as neon, krypton, argon, helium, and mixtures of these and others such as carbon dioxide and nitrogen have been shown to provide laser oscillation in a broad area of the electromagnetic spectrum. A wide range of gases and pressures are used in present-day lasers.

The mechanics of most gas lasers including flowing gas lasers are currently well-known. A great deal of attention has been paid recently to the excitation of a lasing gas to an energy level capable of emitting photons and thereby participating in stimulated emission of coherent light within a laser cavity as a result of energy preferentially transferred to the lasing gas through near-resonant collision with a vibrationally excited energizing gas. One type of gas laser which has received a great deal of attention is the nitrogen-carbon dioxide laser. In this type of gas laser, the nitrogen is excited to the first vibrational level, and it transfers energy into the upper laser level of carbon dioxide preferentially, so as to provide a population inversion which supports laser emission. The emission of photons by the carbon dioxide causes the molecules thereof to assume the energy of the lower laser level and molecules in this energy level rapidly decay via gas collisions to the ground state.

Thus, in the present state of the high power gas laser art, lasing (which is the coherent stimulated emission of quanta of light energy) of one substance results from that substance being brought to a high, non-equilibrium energy state as a result of collisions with an energizing gas excited to a vibrational energy level which closely matches an energy level of the lasing substance. The method of exciting the energizing gas may vary in accordance with the particular design parameters of a given laser. For instance, electric excitation may be used in any of several forms. One well-known form is radio frequency excitation; another form is direct current plasma excitation; and a third known form is microwave excitation. A fourth form utilizes an electron beam. Additionally, it is possible to excite the energizing gas by causing it to absorb intense light of a frequency matched to the spacing of the low-lying vibrational energy levels of the energizing gas.

For a further discussion of a laser capable of developing very high powers, see, for example, U.S. Pat. No. 3,577,096 issued May 4, 1971. See also U.S. Pat. Applications, Ser. No. 626,357 filed Feb. 16, 1967 and Ser. No. 72,982 filed Sept. 17, 1970, now U.S. Patent No. 3,702,973, and assigned to the same Assignee as this application. U.S. Pat. No. 3,577,096 discloses a transverse discharge type high power flowing gas laser; U.S. Pat. Application, Ser. No. 626,357 discloses a gas laser wherein the gas is thermally heated and thereafter suddenly cooled by passing it through a rapid expansion nozzle to freeze the vibrational energy states; and U.S. Pat. Application, Ser. No. 72,982 discloses a transverse discharge high power gas laser using an electron beam.

The present invention obviates the necessity of interposing transparent and/or semi-transparent windows in the optical path of laser amplifiers or oscillators and all of the difficulties and disadvantages inherent in such arrangements especially where the laser device provides a high or very high power laser beam.

It is an object of the present invention to provide an improved gas laser.

It is another object of the present invention to provide a laser which does not require a sealed optical system.

A further object of the present invention is to reduce loss in the optical system of high power gas lasers.

A still further object of the present invention is to provide window means for high power gas lasers wherein the laser beam is not required to pass through a solid material.

A still further object of the present invention is the provision of apparatus for the direct transmission of an intense laser beam from a region occupied by a gas at one pressure to another region occupied by a different gas at a different pressure or to a region occupied by the same gas at a different pressure or to one occupied by a different gas at the same pressure without the flow or diffusion of gas from one region to the other.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
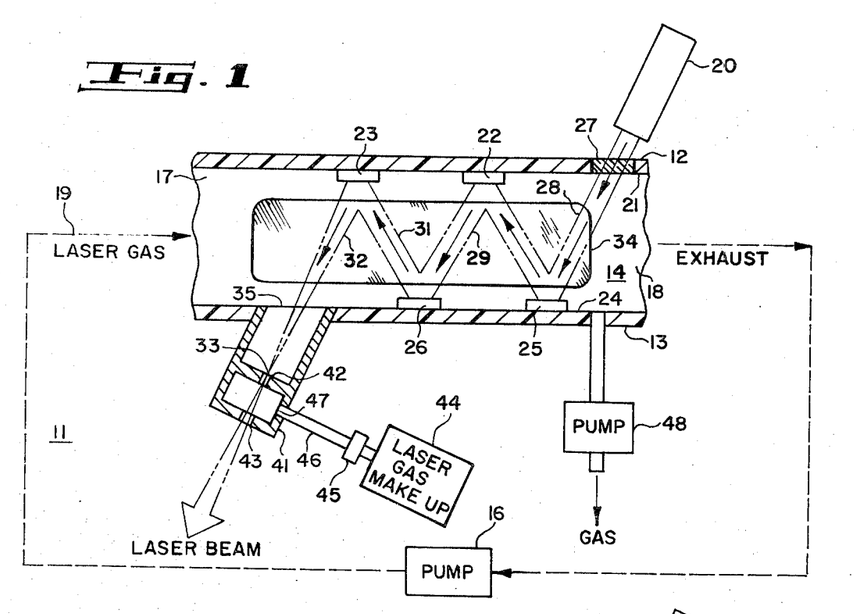
FIG. 1 is a diagrammatic illustration of laser apparatus having output laser window means in accordance with the invention.

With reference now to the drawings and more particularly to FIG. 1, there is illustrated in diagrammatic form an electrically excited flowing gas laser designated generally by the reference number 11 in accordance with the invention for amplifying a low power input laser beam, the laser 11 having spaced electrically nonconductive narrow opposed walls 12 and 13 and spaced broad opposed walls 14 and 15 (only wall 14 is shown) defining the working region of the laser 11. A blower or pump 16 coupled to the inlet 17 and outlet 18 of the working region is provided to cause the active laser gas 19 to flow through the working region at the desired pressure and velocity of, for example, one-tenth atmosphere and Mach 0.2 velocity. Suitable active laser gases are, for example, argon, xenon, krypton or mixtures of $CO_2$, $N_2$ and He.

On the inner surface 21 of wall 12 is mounted fully reflective mirrors 22 and 23 and on the inner surface 24 of wall 13 is mounted fully reflective mirrors 25 and 26, all of which constitute a regenerative laser or optical cavity wherein laser energy enters the working region via solid window 27 and propagates along paths 28–32 between the mirrors and through the active laser gas 19 with amplification when the laser gas is excited to a lasing state, typically by causing an electrical discharge to be maintained through the gas in or adjacent the working region. A single output laser beam 32 is provided by this embodiment. The output mirror 23 focuses the output laser beam 32 to a focal point 33 just exterior of wall 13. The particular means for exciting the active laser gas is not critical to the invention. The active laser gas may be excited by any suitable pumping means such as by an electrical discharge maintained in conventional manner through the gas in the working region by appropriately located electrodes or the like, or, alternately, by means including a broad area electron beam entering through an electron window 34. For a more thorough discussion of suitable laser apparatus utilizing an electron beam for excitation, reference is made to U.S. Pat. Application, Ser. No. 72,982 filed Sept. 17, 1970 and assigned to the same assignee as this application. Where the power of the laser beam entering through window 27 is such that it will not result in destruction of or damage to conventional materials which transmit the laser wavelength being used, a transmissive window of such suitable material is provided as shown in FIG. 1 to permit the laser beam to enter the working region in conventional manner without fear of leakage of air into the working region at this point.

The relatively low power input laser beam from a separate conventional laser 20 is reflected by mirrors 25, 22, 26 and 23 and leaves the working region at opening 35 in wall 13 at a high power level. Disposed around and covering opening 35 is an enclosure or laser window housing 41 having a first laser beam aperture 42 and a second laser beam aperture 43 surrounding and concentric to the extent possible about the axis of the output laser beam 32 emanating from output focusing mirror 23. The output focusing mirror 23 focuses the output laser beam to the extent possible to a focal point 33 in close proximity to the first or innermost laser beam aperture 42. Since the high energy output laser beam is focused, it will be readily appreciated that the diameter of the second laser beam aperture 43 must have a diameter greater than that of the first laser beam aperture 42, and that both laser beam apertures may have diameters substantially equal to or only slightly greater than the effective diameter of the laser beam at these points depending on the amount of fringe radiation it is desired to pass. The diameters of the laser beam apertures are substantially determined by the initial diameter of the laser beam, the optical distances and the degree to which the output laser beam is or may be focused. As will now be seen, focusing the output laser beam to a point or smallest region reasonably possible in the laser beam aperture 42 permits the use at this location of an aperture having the smallest possible diameter which in turn results in the lowest possible volume of gas flow through this aperture while permitting the high energy output laser beam to leave the working region without encountering any physical obstructions.

Coupled to the interior of enclosure 41 intermediate laser beam apertures 42 and 43 is a source 44 of preferably active laser gas under pressure for introducing active laser gas into enclosure 41 via pressure regulating means 45, pipe 46 and gas inlet 47.

Coupled to the interior of the laser is an exhaust pump 48 for continuously exhausting to the atmosphere a predetermined portion of gas flowing in the laser. Where the laser is of the open system type wherein the gas is exhausted to the atmosphere, the exhaust pump 48 is not necessary, the total gas flowing in the working region comprising that supplied to the inlet 17 of the working region and that introduced through laser beam aperture 42 as described in detail hereinafter. However, for the case where the laser is of the more conventional closed system type as illustrated in FIG. 1, it has been found that decomposition of the laser gas may occur when the laser gas is excited by electrical means and/or the laser gas becomes contaminated. Accordingly, it has been found advantageous in these cases to continuously exhaust a portion of the flowing active laser gas and replenish the volume of gas removed by make-up gas to prevent the build up of undesirable components in the laser gas resulting from the contamination and/or decomposition of the gas during operation.

The embodiment of the present invention shown in FIG. 1 contemplates utilization of introduction of make-up gas by introducing the make-up gas into enclosure 41 to simultaneously provide the necessary isolation from the environment surrounding the laser and the required quantity of make-up gas. Thus, in accordance with the invention, the source 44 may comprise make-up gas which may be introduced into enclosure 41 at a rate and pressure, for the operating conditions in the working region, to flow out of laser aperture 43 thereby preventing entry of air into the enclosure via laser beam aperture 43 and to also flow out of laser beam aperture 42 and into the working region at the required rate to match that exhausted via pump 48, for example.

Since a diameter or size of the laser beam aperture 42 can be selected for substantially any size down to very small diameters due to the focusing of the laser beam at this point, it will be understood that the rate of gas introduced into enclosure 41 via gas inlet port 47 can be selected to prevent the entry of air into enclosure 41 via laser beam aperture 43 while simultaneously introducing into the working region active laser gas at the same rate it is exhausted or, alternately, active laser gas may be introduced into the working region at a suitable rate and the rate at which gas is exhausted by pump 48 adjusted to match the rate at which gas is introduced via laser beam aperture 42.

Figure 2:
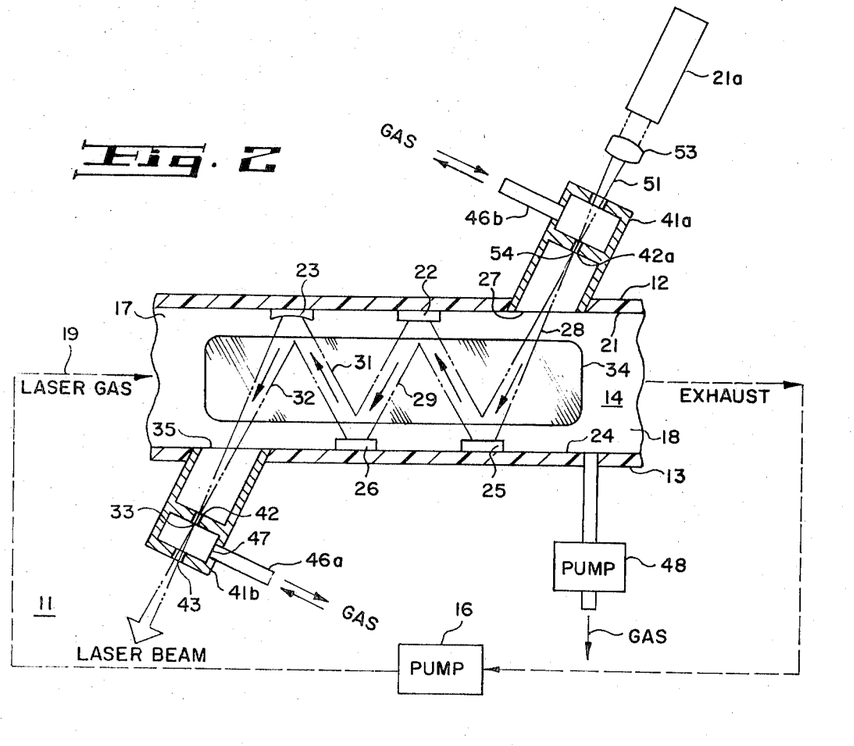
FIG. 2 is a diagrammatic illustration of a further embodiment of laser apparatus having both input and output laser window means in accordance with the invention.

FIG. 2 illustrates a further embodiment of the invention comprising a laser system as shown in FIG. 1 and additionally including an aerodynamic window for introducing into the working region a high power laser beam from a conventional high power laser source 21a. Thus, where it is desired to use as the initial laser source a laser having an output laser beam of sufficiently high output power to adversely affect solid laser windows, the arrangement as shown in FIG. 2 permits the use of such a laser. For such an embodiment, the aerodynamic output window 41 as shown and described in connection with FIG. 1 may be effectively duplicated as the input window 41a. It is to be noted that the input laser beam 51 of FIG. 2 is substantially identical in form to not only the output laser beam 32 of FIG. 2, but also the output laser beam 32 of the embodiment of FIG. 1. Provision of a focused input laser beam is readily provided by suitable conventional and focusing reflecting optics 53 such as, for example, a Cassegrain system to focus the high power output beam of the exterior laser 21a to a point 54 at laser beam aperture 42a of the input window 41a.

Input window 41a and output window 41B may be identical in construction and operation to the output window shown and described in FIG. 1. In the embodiment shown in FIG. 2, active laser gas is supplied to the laser windows via pipes 46a and 46b as and for the purposes described in connection with the output window of FIG. 1. The rate at which gas is exhausted from the laser system as by pump 48 is selected to equal the rate at which the make-up gas is introduced via the input and output windows. Where high heat fluxes are present, the optics 53 and/or the mirrors in the working region may be cooled as by a suitable coolant or the like, as is equally applicable to the enclosures and the means defining the various laser beam apertures. Conventional cooling coils (not shown) may be soldered to appropriate surfaces and a coolant circulated therethrough.

Figure 3:
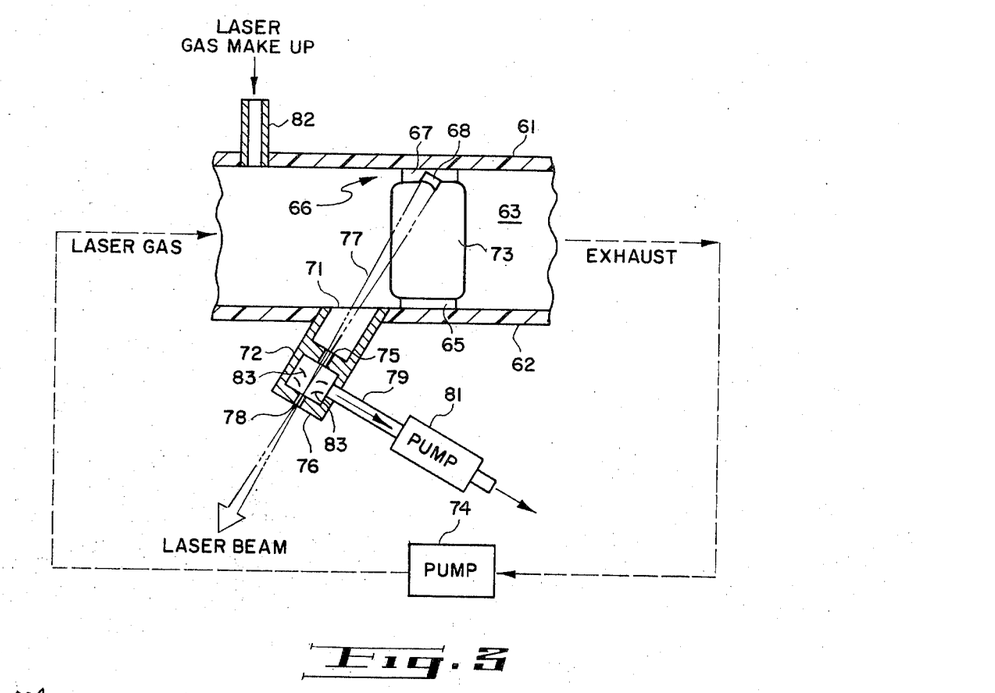
FIG. 3 is a diagrammatic illustration of a still further embodiment of laser apparatus having modified laser window means.

As illustrated in FIG. 3, the present invention may also be practiced in oscillator-type lasers. An illustrative embodiment of the invention as shown in FIG. 3 includes walls 61, 62, 63 and 64 (wall 64 is not shown) defining a working region as and for the purposes described in connection with FIGS. 1 and 2. Also included is a fully reflective mirror 65 carried by wall 62 and an oppositely disposed fully reflective mirror 66 comprising a first annular portion 67 for defining a resonant optical cavity with mirror 65 and a second portion 68 adapted to direct and focus a portion of the stimulated radiation generated in the working region between mirrors 65 and 66 through opening 71 in wall 62 and into enclosure 72. The mirrors 65 and 66 may be disposed as shown transverse to suitable pumping or exciting means including a broad beam electron source 73 more fully described in U.S. Pat. Application, Ser. No. 72,982 for exciting the active laser gas flowing through the working region due to action of pump 74.

Enclosure 72 is disposed around and covers opening 71 and is provided with first and second laser beam apertures 75 and 76 concentric about the axis of the output laser beam 77. As distinguished from the embodiments illustrated in FIGS. 1 and 2, it is to be noted that the portion 68 of mirror 66 comprises an output mirror adapted to direct the output laser beam through the first laser beam aperture 75 and focus it to a focal point or region comprising a focal point 78 at or in close proximity to the second laser beam aperture 76. For the arrangement described above, it will be readily seen that the diameter of the first or innermost laser beam aperture 75 is greater than the diameter of the second or outermost laser beam aperture 76. Reverting now to FIGS. 1 and 2, it will be seen that in FIG. 3 the arrangement of the laser beam apertures has been reversed. Further, the interior of enclosure 72 intermediate the laser beam apertures 75 and 76 is coupled via pipe 79 to an exhaust pump 81. Active laser gas make-up is introduced into the laser via pipe 82 remote from the enclosure 72.

The embodiment illustrated in FIG. 3 is particularly suited for situations wherein it is desired or convenient to exhaust laser gas via enclosure 72 and where necessary, introduces fresh gas elsewhere.

However, as more fully pointed out hereinafter, laser window apparatus as shown in FIG. 3 not only functions equally as well as an input or output window, but permits substantially unobstructed passage of an input or output laser beam, provides isolation of the working region from the surrounding atmosphere, and where desired, permits as much as or little or no flow of active gas from the working region through laser beam aperture 75. in this latter mode is particularly advantageous where there is little or no requirement for make-up gas or alternately, it is desired or convenient to remove gas elsewhere in the laser. This mode of operation is to be contrasted with that described in connection with the embodiment of FIG. 2 which requires commercially significant volumes of make-up gas irrespective of whether or not the provision of make-up gas is deemed necessary for satisfactory operation of the laser.

Since the second or outermost laser beam aperture 76 of FIG. 3 may be provided with the smallest diameter appropriate to operation of the laser and the innermost of first laser beam aperture 75 has the largest diameter, these diameters in conjunction with the capacity of pump 81 may be selected to exhaust laser gas at the desired rate (including substantially no laser gas from the working region) and simultaneously prevent entry of air into the working region.

Since the diameter of laser beam aperture 76 can be of minimum diameter due to the focusing of the output beam at or adjacent this laser beam aperture, it will be understood that the rate of air flowing into enclosure 72 through laser beam aperture 76 can be selectably reduced to a minimum amount. It will be further understood that the diameter of laser beam aperture 75 can also be controlled by selection of its location with respect to laser beam aperture 76 and/or focusing of the output laser beam. Thus, for an appropriate pumping rate for exhaust pump 81, where it is desired that gas be withdrawn from the laser, the desired volume of laser gas can be drawn from the working region through laser beam aperture 75 and exhausted together with all of the air that enters enclosure 72 through laser beam aperture 76.

Air tends to enter enclosure 72 via laser beam aperture 76 in the form of a jet. Accordingly, preferably aerodynamically formed vanes 83 intermediate laser beam apertures 75 and 76 are provided to effect the dissipation of this jet of air over a relatively short distance thereby permitting a substantial reduction in the length of enclosure 72 over that which would be required in the absence of such vanes.

In actual practice, it has been found that the pumping rate of exhaust pump 81 may be easily, simply and inexpensively controlled to provide in enclosure 72 intermediate laser beam apertures 75 and 76 a pressure differential that is linearly controllable over the range of atmospheric pressure at laser beam aperture 76 to a pressure greater than, less than, or equal to the pressure at the working region side of laser beam aperture 75 which is, of course, the pressure in the working region of the laser.

Where windows of the type illustrated in FIG. 3 comprise an input window in combination with a laser as generally illustrated in FIG. 2, the pumping rate of the exhaust pump is conveniently selected to provide only a small rate of flow of laser gas into the window to insure isolation of the working region. Alternately, where windows of the type illustrated in FIG. 3 comprise, for example, both input and output windows of the same laser, the rate of flow of laser gas into one or both of these windows can be selected to be very small or some predetermined rate to meet make-up requirements or the like.

It is to be understood that laser apparatus in accordance with the invention as shown and described only by way of example herein, may form part of substantially any type or kind of gas laser including those having a relatively long tubular working region wherein an active laser gas is caused to move or flow through the working region at either high or low velocities and/or in a direction normal or parallel to the longitudinal axis of the tubular portion.

Figure 4:
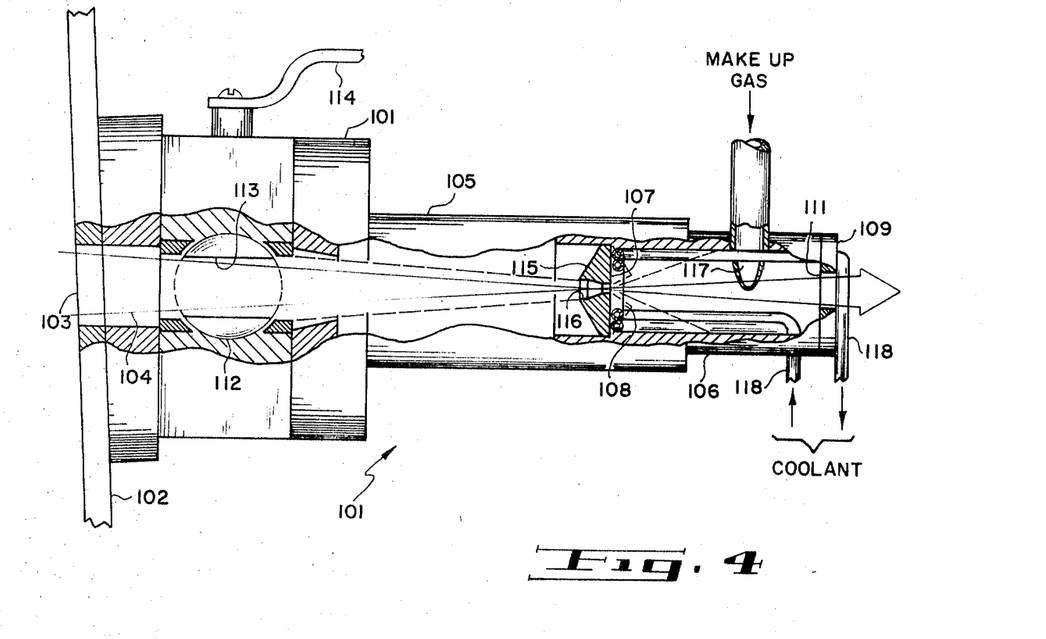
FIG. 4 is a side view showing details of the laser window illustrated in FIG. 1 and FIG. 2.

Attention is now directed to FIG. 4 which shows details of a laser window of the type illustrated in FIGS. 1 and 2. The laser window as shown in FIG. 4 comprises a ball valve assembly 101 adapted to be sealably attached to the laser wall 102 having an opening 103 to receive the output laser beam 104, a cylindrical hollow central portion 105 and a sleeve 106 slidably carried in the central portion 105. Disposed within the sleeve 106 is wall member 107 having a laser beam aperture 108. The outermost end of sleeve 106 is closed by a wall 109 having a laser beam aperture 111 of a size greater than that of laser beam aperture 108. Disposed within the ball valve assembly 101 is a ball valve 112 having a passage 113 for receiving and passing the laser beam 104. The ball valve 112 is sealably carried in the ball assembly 101 whereby when the ball valve is closed as by rotating handle 114, air is prevented from entering the laser via opening 103. Opening 103, passage 113, laser beam aperture 108, and laser beam aperture 111 are each concentric about a common axis and surround and preferably are concentric about the axis of the laser beam 104. The main portion of the laser beam 104 is designated by solid lines and fringe radiation is designated by broken lines.

In the development of the invention, it was found that flat surfaces, even when not polished, often caused spurious modes to develop. Accordingly, in order to avoid the production of spurious modes, wall member 107 is provided with conical surfaces such as conical surfaces 115 and 116 having cone angles to reflect fringe radiation through laser beam aperture 108 and into sleeve 106, where such fringe radiation is harmlessly dissipated. Wall member 107 is shown in FIG. 4 oriented for an output window wherein the laser beam is generated within the laser, focused through opening 103 to a focal point at laser beam aperture 108 and leaves the laser window via laser beam aperture 111. Where the laser window is to function as an input window, the portion of wall member 107 may be advantageously reversed or the portion thereof facing end wall 109 provided with conical surfaces as shown in phantom. The provision of conical surfaces on both sides of wall member 107 is effective in trapping and/or preventing the transmission through wall member 107 of at least some radiations that may adversely affect the operation of the laser and/or the outside laser source.

Disposed between the laser beam apertures 108 and 111 is a gas inlet port 117 coupled to a pressurized source of active laser gas (not shown) and arranged and adapted to cause gas entering sleeve 106 via gas port 117 to enter tangentially and produce a vortex flow within sleeve 106.

As previously pointed out, laser beam aperture 108 may be sized so as to permit the proper mass flow into the laser to meet the entire make-up requirements. Such an appropriate size is possible if, in accordance with the invention, the laser beam is brought to a focal point preferably within laser beam aperture 108. From the standpoint of ease of alignment, it is desirable to have the laser beam aperture 108 as large as possible and since, for a given mass flow, the size of this laser beam aperture depends on the pressure difference across it, the diameter may be increased if this pressure difference is decreased. The provision of a vortex flow within sleeve 106 is most advantageous in this respect since it provides a pressure drop between the two laser beam apertures. With a vortex flow the pressure at the outlet side of laser beam aperture 108 facing wall 109 may be made to approach the pressure at the opposite or inlet side of laser beam aperture 108. Due to thermal expansion, flexure of components or the replacement of mirrors or laser components, the portion of the focal point or region at wall member 107 may change. For this reason, sleeve 106 is advantageously slidably and/or adjustably carried in the central portion 105 to permit adjustment of the location of laser beam aperture 108 radially as well as axially and, hence, maintenance of the optimum relationship between the laser beam aperture and the focal point which is preferably axially located within aperture 108. The location of the laser window and, hence, aperture 108, may also be adjustable with respect to the output mirror to facilitate porper location of aperture 108. Coolant pipe 118 coupled to a suitable source of coolant (not shown) such as water is disposed in intimate contact with sleeve 106, wall member 107, and wall 109. Coolant pipe 118 enters sleeve 106, extends along its inner surface to wall member 107, continues around the outer periphery of wall member 107, returns to and passes through wall 109, continues around the outer periphery of wall 109, and then back to the coolant source or to a drain if water is simply passed through pipe 118.

In actual practice it has been found that laser beams and especially high power laser beams cannot be focused to a true point and that which is generally practically obtainable is a "focal region" determined by physical optics having a particular "depth of field" or axial length. Within the focal region lies the focal point determined by geometric optics. Accordingly, as used herein, the term "focal point" includes focal regions. Further, because in actual practice one must deal with "focal regions" having finite and often appreciable depths of field, the laser beam apertures are disposed as close together as is possible under the circumstances and within the depth of field if possible. From the above, it will be apparent that if this is done, not only one, but both laser beam apertures may be of the smallest possible size with minimum beam interception.

Use of laser windows in accordance with the invention where the pressure within the working region is at or above atmospheric pressure is within the scope of and contemplated by the invention. Thus, where the pressure in the working region is of the order 1–10 times atmospheric pressure or more, such a laser may be provided with laser windows as shown and described herein, such as, for example, as shown in FIG. 2, the pipes 46a and 46b being, however, coupled to a pump or pumps as illustrated in FIG. 3.

The provision of the smallest beam laser aperture between the working region and the gas pipe results in minimum gas being permitted to enter the enclosure and, hence, permits the use of a pump of minimum capacity. The provision of a pump or pumps prevents the gas from being exhausted to the atmosphere. This is especially desirable where gas is toxic or its emission may adversely affect the optical quality of the output laser beam. Thus, if in accordance with the invention, large gas density gradients (gradients in the refractive index) are restricted to a region along the laser beam axis comparable to and at the focal point region, the quality of the output laser beam will not be substantially adversely affected. However, if on the other hand, the laser gas is allowed to issue from the enclosure as a jet over a substantial distance, this will tend to de-focus the output laser beam and adversely affect its optical qualities.

Figure 5:
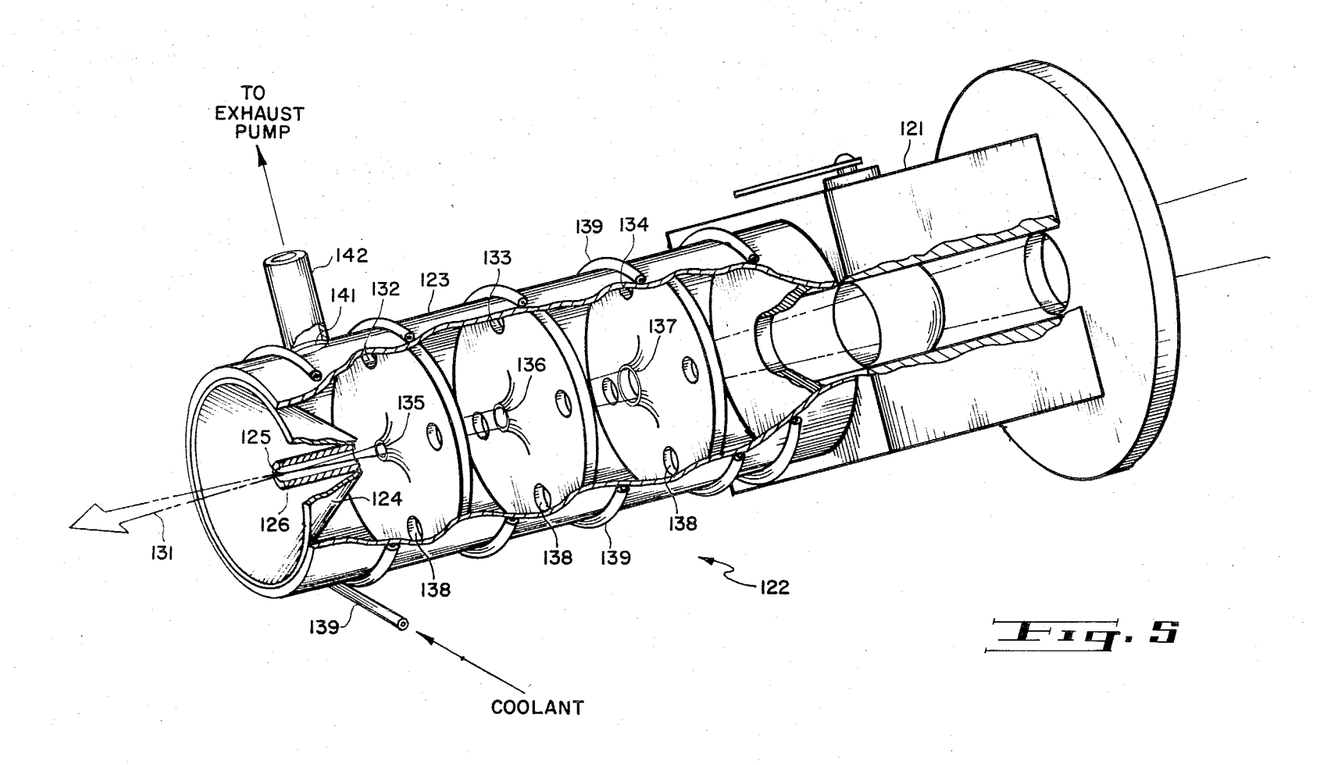
FIG. 5 is a perspective view with parts broken away showing details of the laser window illustrated in FIG. 3.

Directing attention now to FIG. 5, there is shown details of a laser window of the type illustrated in FIG. 3 wherein the laser window is coupled to an exhaust pump. As illustrated in FIG. 5, a laser window in accordance with the invention which may function either as an input or output laser window may comprise a ball valve assembly 121 or the like adapted to be connected to the laser wall as and for the same purposes discussed in connection with FIG. 4. Extending outwardly from the ball valve 121 is a main body portion 122 comprising a tubular outer wall 123 closed at its outermost end by a conical shaped end wall 124 having a laser beam aperture 125 defined by a tubular portion 126 substantially whereat the laser beam 131 is focused as and for the purposes previously discussed. Disposed within the main body portion 122 are a plurality of vane members are 132, 133 and 134 (three are shown by way of example) having axially disposed laser beam apertures 135, 136 and 137, each of a diameter just slightly greater than the effective diameter of the laser beam passing therethrough. The vane members 132, 133 and 134 are preferably spaced close to one another and in close proximity to end wall 124 to facilitate dissipation of the air jet entering the laser window through laser beam aperture 125 and to permit the use of laser apertures of the smallest possible size. The vane members may conveniently be formed of a highly conductive and ductile material such as copper each with a plurality of radially disposed passages 138 and with central portions gradually curving in the direction of laser beam aperture 125 and terminating at their respective laser beam apertures 135, 136 and 137 as shown in FIG. 5. The gradually curving central portions of the vane members which may conveniently be formed in a die, function to intercept the expanding air jet entering laser beam aperture 125 and dissipate it over as short a distance as is conveniently possible. A coolant pipe 139 is shown encircling the outer wall 123 and wall 123 is also provided with a gas port 141 adjacent end wall 124 for connection via pipe 142 to an exhaust pump.

In operation, the laser beam is provided with a focal region as shown which includes laser beam aperture 125 and the exhaust pump actuated to affect the mass flow rate through the vane member passages and laser beam apertures and gas port 141 to provide at the ball valve assembly, for example, a pressure just slightly greater than that present in the working region of the laser. The provision of such a pressure insures a small but continuous flow of active laser gas from the laser working region and into the laser window. Such a small flow of laser gas insures isolation of the interior of the laser with minimum expenditure of laser gas. During operation, air enters the laser window via laser beam aperture 125 at a relatively high rate and tends to form an expanding jet extending into the laser window through the laser beam apertures of the vane members. However, the vane members are effective to dissipate this jet of air prior to its reaching, for example, the ball valve assembly, or alternately, the laser beam aperture in the laser wall. Where the jet formed at aperture 125 is a problem, the use of tubular portion 126 may be found advantageous. Alternately, portion 126 can be omitted or it can be formed in the nature of a vane to effect spreading of the jet inside the window as it leaves aperture 125.

Figure 6:
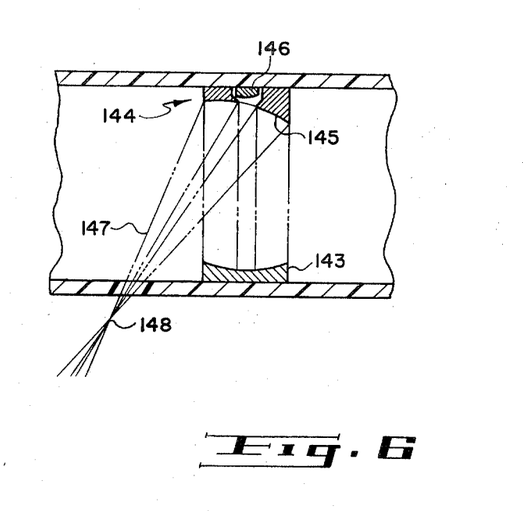
FIG. 6 is a diagrammatic illustration of an unstable cavity in accordance with the invention.

Fig. 6 illustrates an alternate arrangement for focusing the output laser beam. As illustrated in FIG. 6, the optical cavity may be of the unstable type comprising a concave mirror 143 and an output mirror 144 comprising an annular output portion 145 and a convex central portion 146. The output portion 145 provides an annularly shaped output laser beam 147 focused to form a focal region 148 as and for the purposes set forth hereinabove.

Figure 7:
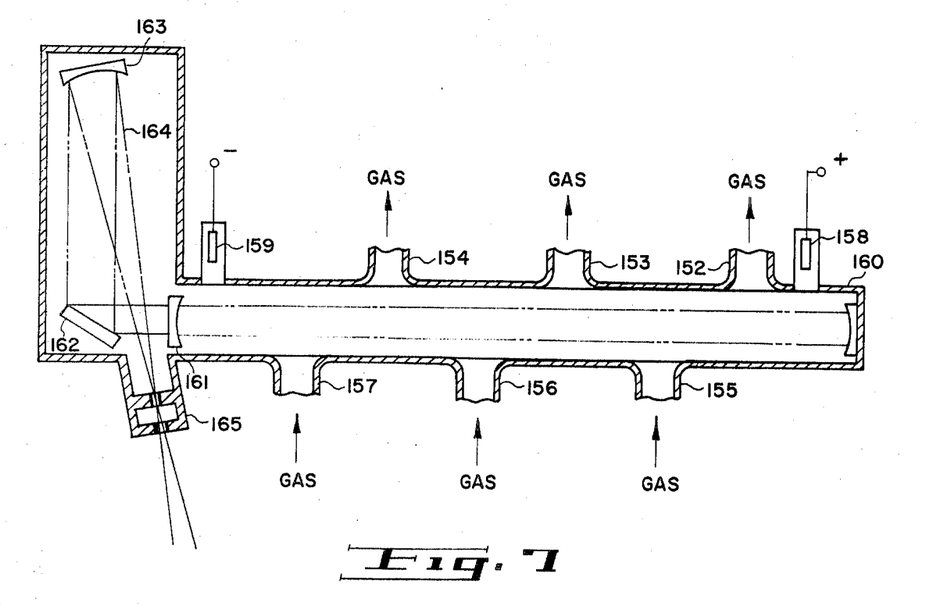
FIG. 7 shows a tubular type laser in accordance with the invention.

FIG. 7 illustrates a tubular type gas laser in accordance with the invention wherein the working region is defined by an elongated tubular section having gas outlet ports 152, 153 and 154 and gas inlet ports 155, 156 and 157 coupled to a source of active laser gas (not shown) for effecting a flow through the working region. For small rates of flow only ports 152 and 157 may be required. Excitation is provided in conventional manner by electrodes 158 and 159 and the optical cavity is defined by fully reflective mirror 160 and partially reflective mirror 161. Mirror 161 is adapted to transmit a portion of the laser beam to mirror 162. The beam incident on mirror 162 is reflected to output mirror 163 which focuses the output laser beam 164 to a focal region within a window 165 of the type described herein. In tubular type lasers, depending inter alia, on the power output thereof, all but perhaps one of the inlet or outlet ports may be omitted and the desired gas flow effected through output window.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. In a gaseous laser system comprising a cavity containing an active gaseous medium capable of being excited to provide stimulated emission of radiation and additionally including means defining an optical cavity and exciting means for exciting said gaseous medium to provide in said optical cavity said stimulated emission of radiation, aerodynamic window apparatus comprising:

a. means defining a first laser beam aperture for providing optical communication between the environment exterior of said cavity and stimulated emission of radiation produced in said cavity;

b. enclosure means sealably surrounding and extending outwardly from said first laser beam aperture, said enclosure means having a gas port and having a second laser beam aperture spaced from and in optical alignment with said first laser beam aperture, said gas port being arranged and adapted to be coupled to means for providing a gas flow through said gas port and the interior of said enclosure means intermediate said first and second laser beam apertures at subsonic velocity;

c. a plurality of vane members having centrally disposed apertures, said vane members being spaced one from another and disposed within said enclosure means intermediate said first and second laser beam apertures, said vane member apertures being in optical alignment with said first and second laser beam apertures and the portion of said vane members surrounding said apertures having a substantially aerodynamic configuration substantially effective to intercept a gaseous jet formed at one of said laser beam apertures and dissipate said jet prior to its reaching the other of said laser beam apertures, the portions of the interior of said enclosure intermediate said vane members each being in communication with said gas port; and d. optical means in optical communication with stimulated emission of radiation in said cavity and with the environment exterior of said cavity through said laser beam apertures, said optical means having a focal region having a finite depth of field located within said enclosure, said vane members being located within said depth of field.

2. The combination as defined in claim 1 wherein said first laser beam aperture is of a size and located with respect to said focal region to provide minimum flow of gas there through.

3. The combination as defined in claim 1 and additionally including:

a. first gas pumping means for maintaining the pressure in said cavity at a value less than atmospheric; and b. second gas pumping means coupled to said gas port for providing said gas flow through said enclosure means having a pressure at said first laser beam aperture only slightly different from that in said cavity, and said first laser beam aperture is of a size and located with respect to said focal region to provide for the pressure in said enclosure a predetermined flow of gas through said first laser beam aperture.

4. The combination as defined in claim 3 wherein the inner surface of said enclosure means intermediate said first and second laser beam apertures is cylindrical, said gas port is coupled to a pressurized gas source, and said gas is introduced tangentially into said enclosure means to produce a vortex.

5. The combination as defined in claim 1 wherein the size of said second laser beam aperture is less than the size of said first laser beam aperture.

6. The combination as defined in claim 5 and additionally including:

a. exhaust pump means coupled to said gas port for exhausting gas from said enclosure.

7. The combination as defined in claim 6 wherein said exhaust pump means is adapted to maintain in said enclosure at said first laser beam aperture a pressure less than that in said cavity and said laser beam apertures and said vane member apertures are of a size to provide for the pressure in said enclosure a substantially minimum flow of gas from said cavity and into said enclosure.

8. In a gaseous laser system where an active medium comprising a gas capable of being excited to provide stimulated emission of radiation flows through means defining a cavity at subatmospheric pressure and including reflector means in said cavity for forming a laser beam, aerodynamic window apparatus for coupling at least a portion of said laser beam out of said cavity comprising:

a. means defining a first laser beam aperture forming an exit for said laser beam;

b. enclosure means sealably surrounding and extending outwardly from said first laser beam aperture, said enclosure means having a gas port and having a second laser beam aperture spaced from and in optical alignment with said first laser beam aperture, said gas port being arranged and adapted to be coupled to means for providing a gas flow through said gas port and the interior of said enclosure means intermediate said first and second laser beam apertures at subsonic velocity;

c. a plurality of vane members having centrally disposed apertures, said vane members being spaced one from another and disposed within said enclosure means intermediate said first and second laser beam apertures, said vane member apertures being in optical alignment with said first and second laser beam apertures and the portion of said vane members surrounding said apertures gradually curving toward said second laser beam aperture to define a substantially aerodynamic configuration substantially effective to intercept a gaseous jet formed at said second laser beam aperture and dissipate said jet prior to its reaching said first laser beam aperture, the portions of the interior of said enclosure intermediate said vane members each being at least substantially in communication with said gas port; and d. optical means for receiving and directing a portion of said laser beam out of said cavity through said enclosure means via said first and second laser beam apertures and said vane member apertures, said optical means focusing said directed beam to a focal region having a finite depth of field located within said enclosure, said vane members being located within said depth of field.

9. The combination as defined in claim 8 wherein the surface delineating said first laser beam aperture is at least in part generally conical in shape and decreases in diameter in the direction of said directed beam.

10. The combination as defined in claim 8 wherein the surfaces of said means defining said first laser beam aperture are disposed at an angle to the longitudinal axis of said directed beam whereby radiation reflected therefrom is reflected at an angle to the longitudinal axis of said directed beam sufficient to at least substantially prevent the development of spurious modes in said directed beam.

11. The combination as defined in claim 8 wherein the surface delineating said first laser beam aperture is disposed and arranged to reflect radiation incident thereon into said enclosure.

12. The combination as defined in claim 8 and additionally including:
   a. first gas pumping means for maintaining the pressure in said cavity at a value less than atmospheric; and
   b. second gas pumping means coupled to said gas port for providing said gas flow through said enclosure means having a pressure at said first laser beam aperture only slightly different from that in said cavity, and said laser beam apertures and said vane member apertures are of a size and located with respect to said focal region to provide for the pressure within said enclosure a predetermined flow of gas through said first laser beam aperture.

13. The combination as defined in claim 12 wherein the pressure in said enclosure means is greater than that in the cavity whereby said predetermined gas flow is from said enclosure means into said cavity.

14. The combination as defined in claim 13 and additionally including valve means for selectively preventing the flow of gas between said cavity and said enclosure means.

15. The combination as defined in claim 8 wherein the inner surface of said enclosure means intermediate said first and second laser beam apertures is cylindrical, said gas port is coupled to a pressurized gas source, and said gas is introduced tangentially into said enclosure means to produce a vortex.

16. The combination as defined in claim 12 wherein the pressure in said enclosure means at said first laser beam aperture is less than that in the cavity whereby said predetermined gas flow is from said cavity into said enclosure means.

17. The combination as defined in claim 16 wherein said second gas pumping means includes an exhaust pump for exhausting gas from said enclosure means.

18. The combination as defined in claim 17 and additionally including valve means for selectively preventing the flow of gas between said cavity and said enclosure means.

19. In the production of laser radiation, the steps of:

a. flowing an active gaseous medium at less than atmospheric pressure through an optical cavity;
   b. exciting said medium to produce laser radiation in said cavity;
   c. directing a beam comprising at least a portion of said laser radiation out of said cavity and into the atmosphere through an enclosure including at least two adjacent first and second open laser beam apertures of a size not significantly greater than that of said beam passing therethrough;
   d. focusing said portion of said laser radiation to a focal region having a finite depth of field located within said enclosure;
   e. providing a subsonic gas flow intermediate said first and second apertures and out of said enclosure through a gas port producing a pressure there between that in combination with the size of said apertures provides a first predetermined flow of gas from said cavity through said first aperture and into said enclosure substantially less than a second flow of gas from the atmosphere into said enclosure as an expanding jet at said second aperture; and
   f. sequentially intercepting the peripheral portion of said expanding jet within said focal region depth of field to effectively dissipate said jet before it reaches said first aperture.

* * * * *

UNITED STATES PATENT OFFICE
CERTIFICATE OF CORRECTION

Patent No. 3,851,273            Dated November 26, 1974

Inventor(s) Ethan D. Hoag, Richard M. Patrick, Edward V. Locke & Richard A. Hella It is certified that error appears in the above-identified patent and that said Letters Patent are hereby corrected as shown below:

Column 6, line 11, after "75.", insert ---Operation---; and

Column 7, line 32, after "ball" (first occurrence), insert ---valve---.

Signed and sealed this 4th day of March 1975.

(SEAL)
Attest:

RUTH C. MASON
Attesting Officer

C. MARSHALL DANN
Commissioner of Patents
and Trademarks